P. D. MILLOY.
METALLIC TREAD FOR TIRES.
APPLICATION FILED APR. 4, 1913.
1,131,070.
Patented Mar. 9, 1915.
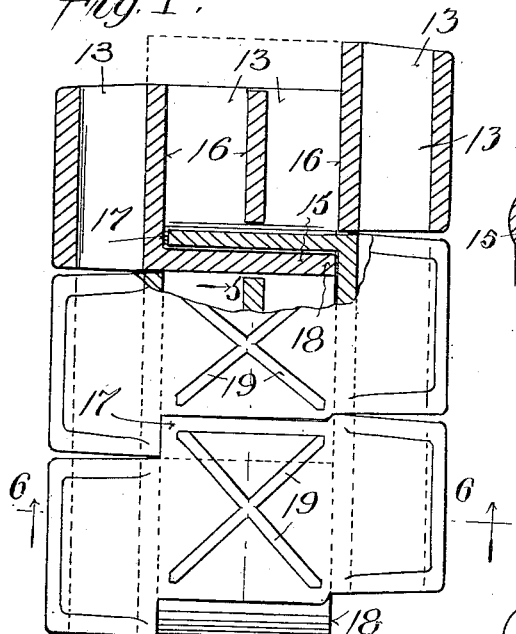
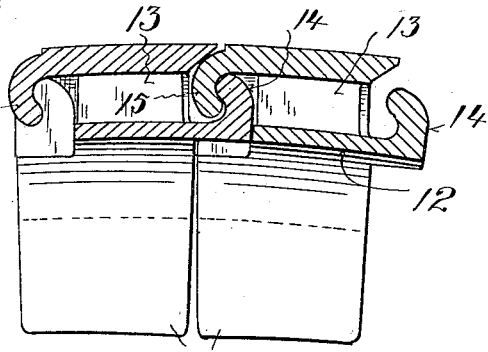
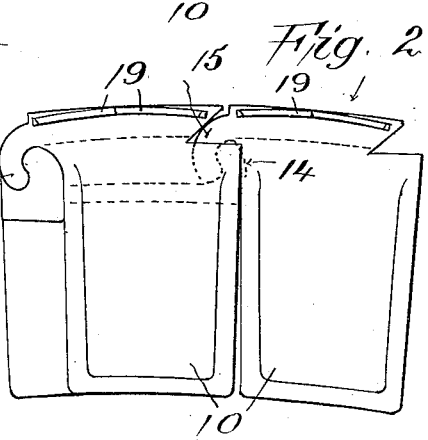
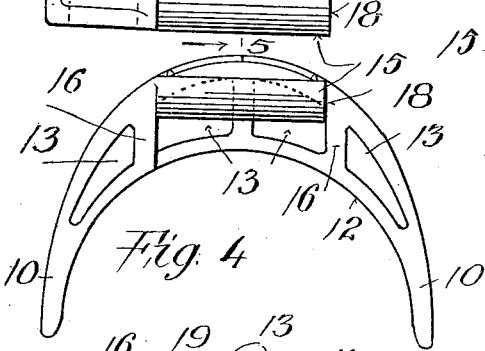
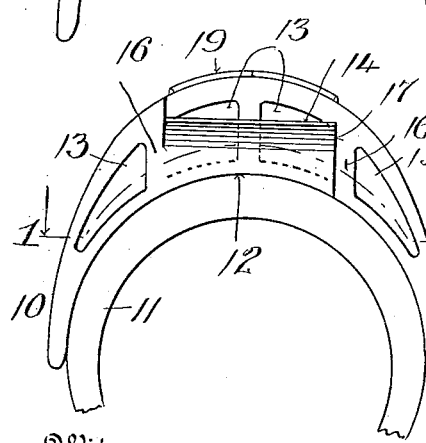
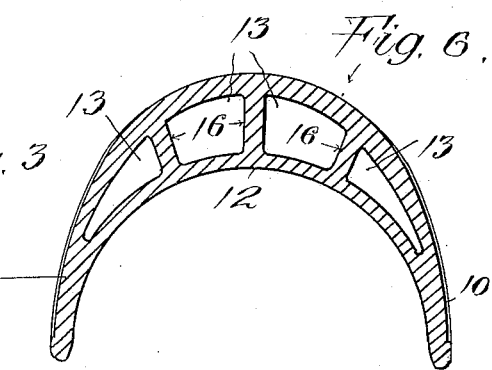
Witnesses:
Inventor
Peter D. Milloy
By his Attorney
Samuel E. Darby

UNITED STATES PATENT OFFICE.

PETER D. MILLOY, OF NEW YORK, N. Y.

METALLIC TREAD FOR TIRES.

1,131,070. Specification of Letters Patent. Patented Mar. 9, 1915.

Application filed April 4, 1913. Serial No. 758,755.

*To all whom it may concern:*

Be it known that I, PETER D. MILLOY, a citizen of the United States, residing at New York, in the county of Queens, State of New York, have made a certain new and useful Invention in Metallic Treads for Tires, of which the following is a specification.

This invention relates to metallic treads for tires.

The object of the invention is to provide a tire tread or armor which is simple in construction, economical to manufacture and efficient in use.

A further object is to provide a tire tread or armor of the character referred to which avoids the danger of cutting or injuring the tire when in use.

A further object is to provide a tread or armor of the character referred to wherein provision is made to guard against the ill effects of heat developed by the movement of the tires over the surface of the ground or pavement.

Other objects of the invention will appear more fully hereinafter.

The invention consists substantially in the construction, combination, location and relative arrangement of parts, all as will be more fully hereinafter set forth, as shown in the accompanying drawing and finally pointed out in the appended claims.

Referring to the accompanying drawing:—Figure 1 is a view in top plan of three assembled units of a tire tread or armor embodying the principles of my invention, one of said units being in section on the line 1, 1, Fig. 3. Fig. 2 is a view in side elevation showing two of the tread or armor units in assembled relation. Fig. 3 is an elevation of one end of a unit. Fig. 4 is a similar view of the other end of the unit. Fig. 5 is a view in longitudinal section on the line 5, 5, Fig. 1. Fig. 6 is a view in transverse section on the line 6, 6, Fig. 1.

The same part is designated by the same reference numeral wherever it occurs throughout the several views.

In the use of metallic treads or armor for tires, and particularly for the rubber inflatable tires such as are used on automobile wheels, it is important to secure strength without undue weight. It is also important to avoid the use of ribs or projections which come in contact with the tire and which are liable to cut or otherwise injure the tire body. Moreover, as is well known, when tires having metallic armor or treads are operated at high speeds over the surface of the ground or street pavements heat is developed in the metal body of the armor which, if unduly transmitted to the tire vulcanizes or unduly heats the same, thereby causing injury.

It is among the special purposes of my present invention to provide a metallic tire, tread or armor made up of sections or units which are shaped transversely on the inner surface thereof to conform to the exterior surface contour of the tire, and so formed as to present a smooth continuous surface to contact with the surface of the tire. I also propose to form the armor units hollow with suitable interior strengthening ribs to secure strength and rigidity and to enable the armor to withstand the weight of the car and its load without danger of breaking, and I extend the hollow interior spaces of the unit all the way through the unit from one end surface thereof to the other, thereby forming air passage spaces which serve to take up the heat generated when the armored tire is moved rapidly over the surface of the ground, thereby maintaining the armor cool and preventing the generated heat from being conducted to the tire. I also propose to so construct the tread or armor units that they may be readily and easily assembled in encompassing relation to the exterior surface of the tire, and readily and easily detached or replaced as units whenever necessary and when assembled, so as to be flexibly connected together.

The armor unit is preferably in the form of a casting of general segmental shape in cross section and having the curved side portions 10, 10, designed to embrace and encircle the outer portion of the tire 11, as shown in Fig. 4, the entire inner surface 12 of the unit presenting an unbroken smooth contact throughout the extent thereof with the outer surface of the tire. Each unit is provided with longitudinally extending air spaces or chambers 13, which extend all the way through the body of the unit from end to end thereof and separated from each other by suitable strengthening ribs 16, as clearly shown. Each unit is formed with integral hook shaped engaging portions 14, 15, at the respective ends thereof, which extend part way across the end surfaces of the unit, and which are reversely arranged, that is, the one, 14, is an upturned and the other 15, is a downturned hook shaped member. These hook members are cast integral with the unit and afford means for coupling up the proximate ends of adjacent units in assembling them, the downturned hook member on one unit engaging with the upturned hook member on the proximate end of the adjacent unit; as shown most clearly in Fig. 5. In order to facilitate the assembling of the units into a tire covering, the hook members 14, 15, are in the form of projections or extensions from the end surfaces of the unit and the one member, as 14, terminates at one end thereof in a shoulder 17, which is offset from the end surface of the body of the unit and the opposite end of the hook member 15, is similarly offset from the end surface of the unit body forming a shoulder 18. By this construction the assembly of the units is greatly facilitated as all that is required is to bring the proximate end surfaces of adjacent units into contact endwise with each other with the shoulder 17 of the one directly opposite the shoulder 18 of the other, and then shifting said units laterally so as to cause the hook portions 14, 15, thereof to slide into engaging relation with each other. Similarly for repair or replacement of individual units all that is required is to slide the unit to be moved sidewise or transversely to the tire until the hook portions thereof are disengaged from the hook portions on the proximate ends of the adjacent units.

If desired the surface of the armor or tread units which comes in contact with the ground may be suitably roughened in any convenient manner, as by scoring or grooving the same, as indicated at 19.

The provision of the unbroken smooth interior surface 12 of the armor units avoids the danger of cutting or injuring the tire body. The air spaces or channels 13 afford a circulation of air which prevents the heat generated in the body of the armor units from being unduly transmitted to the rubber tire, the ribs 16 affording strength and rigidity to the armor units. The engaging integral hook members 14, 15 constructed and arranged as described afford means for flexibly coupling up the units into a ring to be applied to the tire.

In applying a coupled up ring to a tire the tire is deflated and sprung into the ring of assembled units. The tire is inflated so as to take an efficient bearing against the smooth interior surface of the armor ring. If it is desired to replace any particular unit of the assembled armor ring the tire is deflated, the unit to be replaced is removed and a new one substituted and the tire again inflated.

Having now set forth the object and nature of my invention, and a construction embodying the principles thereof, what I claim as new and useful and of my own invention, and desire to secure by Letters Patent is:—

1. A metallic tread or armor for tires, composed of units coupled together, each unit presenting a smooth uninterrupted bearing surface for the tire, and having integral, reversely presented hook members extending partially across the same in opposite directions at the respective ends thereof for coupling engagement with cooperating hook members on the proximate ends of adjacent units, said hook members respectively terminating in off-set shoulders at the respectively opposite sides of the unit.

2. A metallic tread or armor for tires, composed of units coupled together, each unit presenting a smooth uninterrupted bearing for the tire, and having integral reversely presented hook members extending partially across the same from opposite sides of the same at the respective ends thereof, the unit at each end being extended at one side beyond the proximate end of the hook member at that end to form an abutting shoulder, the body of said unit having longitudinal air ducts or channels therethrough.

In testimony whereof I have hereunto set my hand in the presence of the subscribing witnesses, on this 31st day of March A. D., 1913.

PETER D. MILLOY.

Witnesses:
G. A. McGRATH,
S. E. DARBY.